Sept. 12, 1950     T. S. GORTON, JR     2,522,221
RAPID FREEZE PROCESS FOR FOOD PRODUCTS
Filed Sept. 20, 1944
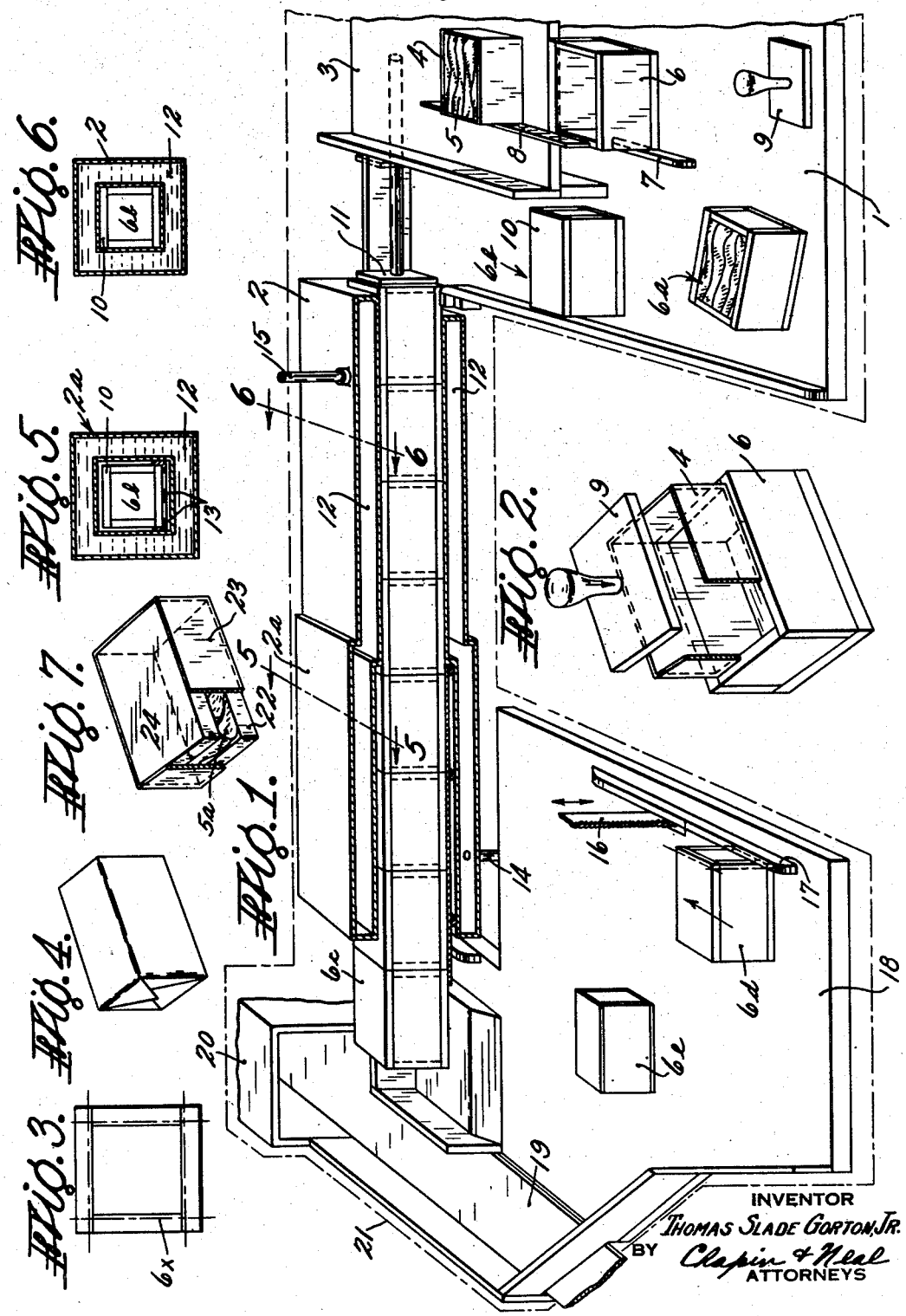
INVENTOR
*Thomas Slade Gorton, Jr.*
BY *Chapin & Neal*
ATTORNEYS Patented Sept. 12, 1950

2,522,221

UNITED STATES PATENT OFFICE 2,522,221

RAPID FREEZE PROCESS FOR FOOD PRODUCTS

Thomas Slade Gorton, Jr., Chicago, Ill.

Application September 20, 1944, Serial No. 554,889

1 Claim. (Cl. 99—192)

This invention relates to a process for quick freezing food products and to the marketable package resulting therefrom. My invention is concerned more particularly with the freezing and packaging of the more solid food products such as fish, meats, vegetables, and fruits and has for one of its objects the preparation of such a product for the consumer market in a manner that will furnish proof of non-deterioration. Another object is to obtain quick freezing of the product in the most efficient and economical manner.

The advantages of quick frozen food products as to the preservation of the palatable and wholesome qualities therein are well known. However, under present marketing conditions the consumer in purchasing many of such products has no adequate assurance that what may have originated as a quick frozen product in the producer's hands reaches him the consumer, in a continued frozen condition. In other words the product may have in the course of distribution, shipping, storage, handling, etc., been thawed or partially thawed out and then refrozen for the final sale to the consumer. This is due to the fact that many of such products are packaged in a manner to retain the same form and appearance whether they remain frozen or not. A carload or other shipment of such frozen products if carelessly allowed to thaw out may not be sufficiently spoiled to be condemned as unwholesome. Yet the high grade palatable quality thereof may be completely lost even with a partial thawing out of the original hard frozen condition.

Such thawed out but yet edible products may be refrozen to reach the consumer with the same appearance as when leaving the producer. The consumer never knows the difference until he tastes the product and is then puzzled to account for the poor quality. He has no way of telling that the goods may have been thawed out and refrozen. Such occurrences, which may very easily occur under the present practice of preparing and marketing these goods, will tend to destroy the high quality reputation enjoyed by quick frozen products. Under the conditions of distribution now prevailing the producer is helpless to prevent or control such damage to his goodwill and business. The reason is as stated above that many thawed-out products may be refrozen to give the same form and appearance as if not thawed out.

Having the foregoing considerations in mind one of the important advantages of my invention will be quickly appreciated. My method contemplates packaging the product in a manner that the original form and appearance of the package will disappear if once thawed out and there will be no practical way for the intermediate handlers of the product to restore the original package appearance if once thawed out. This is accomplished by providing a holder formed of ice walls to receive and give shape to the contained food product prior to being frozen, then freezing the same together as a unit and finally wrapping the whole in an outside sealed wrapper or carton. Ice walls from the original holder or container remain as a part of the marketed package. The unimpaired condition of said ice walls furnish evidence of the unimpaired condition of said frozen package. The wrapper serves as a protective covering and is preferably sealed and of a material which is moisture and vapor proof so as to prevent evaporation of the enclosed package. In such a package when once the ice walls are gone the original form and inside appearance of the package is gone also and no salable quick frozen package remains. By using clear transparent ice for the holder walls and a moisture proof transparent sheet of material for the outer wrapper, a practical marketable package is obtained wherein the contents are on visual display for the attraction of customers.

Heretofore the preparation of quick frozen food products in marketable packages has required a preliminary packing of the same in a carton or the like and thereafter freezing the product through the walls of the carton. Likewise when food products are frozen in metal containers the refrigerant must act through the walls of the container, and in this case the metal container does not remain with the product as part of the marketable package. In both cases the refrigerating efficiency is impaired by the insulating effect of the container walls.

In my process on the contrary the container walls of ice help to improve the efficiency of the refrigerating medium and this is particularly so when the food product is packed tightly and compactly in direct and intimate contact with the ice walls of the holder as is preferable in my process. While I prefer packing the food product directly in contact with the ice walls of the holder for utmost efficiency nevertheless much of the advantages of my process are still obtained even though a thin light sheet of cellophane parchment or the like may be used as a covering for a unit contained in the ice wall holder.

As a further step for improving the efficiency of my process I propose to precool the ice walls of the holder or container preparatory to packing the food product therein. Such precooling of the ice walls may be as low as —10° F. for excellent results, and some efficiency will be gained by a precooling temperature anywhere below +20° F. but the lower the better. The chief consideration in this respect is that the food product shall begin to transfer its heat to the ice walls as soon as packed therein and that the ice walls shall be sufficiently precooled to conduct said heat away from the food product without starting to thaw. Naturally the lower the precooled temperature of the ice walls the faster will be the transfer of heat thereto from the food product which is the main desideratum in the quick freezing process.

To further exploit the advantages of the precooled ice walls of the holder or container I propose to make said walls relatively thick and heavy as compared with the contained food product. I thus provide relatively high capacity for heat absorption in the container walls during the freezing of the food product. When the freezing of the food product has been completed, the ice walls of the holder may be cut down by mechanical means, viz. by sawing into relatively thin light weight walls, preparatory to being wrapped or cartoned for the final marketable package. For some kinds and sizes of food products the ice walls may be substantially or entirely cut away prior to the final wrapping. The controlling element in this respect is that the frozen unit as prepared for its final wrapping shall have sufficient rigidity and be of suitable shape and size for convenient handling in an automatic wrapping machine.

The preformed ice wall container for my process may be made up in various ways. For example I may fabricate a rectangular prismatic hollow block from slabs of ice about 3 inches thick, the ice slabs being either frozen into the form and size desired or cut from larger blocks. Another way to provide the containers is to cut holes in spaced apart relation through a large three inch slab of ice and then use other thick slabs of ice for the top and bottom lids to the pockets thus formed.

After the ice wall container or holder is packed with its food product the whole may be frozen together as a unit in any suitable freezer or freezing compartment. For quick freezing the temperature of the usual freezer is carried down to about —20° to —30° F. By the use of my ice wall containers the quick freezing time as heretofore required will be considerably reduced. Furthermore it will be practical in my process to perform the quick freezing step as a continuous operation by passing the ice container packed product slowly through a refrigerating tunnel, the walls of which on one side are in close contact with the ice containers and on the other side with the refrigerating agent. The ice containers will be kept for a long enough period in the tunnel to thoroughly freeze the contained food product and the usual food product, as for example fillets of fish will supply enough moisture within each container to thoroughly freeze the food product and its container together as an integral unit.

It will be understood that while the inner surfaces of the precooled ice slabs are relatively dry due to the frozen condition thereof, yet the unfrozen food product when introduced into the container will be sufficiently moist to make a frozen bond between the contacting surfaces of the food product and the slabs of ice. This will occur to some degree even when the food product is initially packed in separately wrapped units. Other than the moisture naturally contained in said food product and on its surface there will be no excess of liquid to be frozen in the container.

Upon emerging from the refrigerating tunnel the separate ice walled packages are then individually wrapped in a flexible wrapping material or in a carton and stored for shipment. It is preferred, however, that the relatively thick walls of ice of the package be thinned down to about ⅛ inch thickness or less before the final wrapping. This may be accomplished by sawing off the surplus thickness of said ice walls as previously mentioned. The saving in shipping weight will be considerable by thus thinning down the walls of the ice container. Obviously during the wrapping operation, storage and shipment the package must be maintained at a sufficiently low temperature to prevent thawing. Any failure in this regard irretrievably destroys the form of the package which thus becomes the consumer's guarantee of an unthawed-out product as well as a protection to the producer's reputation for a high quality product.

The foregoing general description of my process is believed to be sufficient to enable those skilled in the art to carry out the same either by hand operations or by devising suitable apparatus and machinery therefor. In the accompanying drawings I have disclosed somewhat diagrammatically apparatus which in conjunction with certain manual operations may be employed for carrying out the process. It is to be understood, however, that the apparatus shown is for illustrative purpose only and for making clear certain of the detail features and advantages of my process.

Fig. 1 is a perspective view of the make-up table, the refrigerating tunnel and the delivery table with its appurtenances;

Fig. 2 is a perspective view of the ice container, form box, and a hand plunger in relative positions for loading the container;

Fig. 3 is an end view of the closed ice container illustrating by dotted lines the surplus stock removed from the ice walls;

Fig. 4 is a perspective view of a completely wrapped package ready for market;

Fig. 5 is a cross section of the refrigerating tunnel at 5—5, Fig. 1;

Fig. 6 is a cross section of the refrigerating tunnel at 6—6, Fig. 1; and

Fig. 7 is a view in perspective and partly broken away to show the formation of a modified form of package in which only upper and lower slabs of ice are used for the package. In this view the package is shown as being surrounded at the sides by the metal former.

Referring to Fig. 1 of the drawings 1 indicates a make-up table upon which the package is prepared for being introduced into a refrigerating tunnel indicated generally at 2. At the forward part of said table 1, a raised shelf 3 may be provided upon which a form frame 4 serves as a mold and is preferably made up of four metal sides with no top or bottom. While resting on a flat support such as the shelf 3, the form frame will be packed full with the food product 5 to be frozen such for example as fillets of fish.

An ice formed container as indicated at 6 will also be made up and placed upon the table 1 against the end of the shelf 3 and its position will be guided by a fixed guide rail 7 on said table. The container 6 at this stage will be in rectangular box shape with five sides and an open top. The sides of said ice container are constituted by rectangular slabs of ice preferably about 3 inches thick.

When positioned as described the top edges of the container side walls will be at a level with the surface of the shelf 3. The form frame 4 filled with its food product may be slid along the shelf 3 against a fixed guide rail 8 on said shelf, to a position on top of the ice container 6 and in registration therewith as shown in Fig. 2. Thereupon a hand plunger such as 9 may be employed to push the food product out of the form frame 4 into the ice container 6, thereby loading the latter substantially full. Preferably only enough free space is left within the container to allow for expansion of the subsequently frozen food product within the closed container. The ice container thus filled with food product is indicated at 6a in Fig. 1. Next, a top slab or cover lid of ice such as 10 also about 3 inches thick is placed upon the open top of the ice container 6 so as to completely enclose the food product in ice. The closed ice container will have the appearance of 6b in Fig. 1. The food product within the ice container so formed, is preferably in direct and intimate contact with ice slabs of about 3 inches thick on all six sides of said container. The formation of the container 6 from the slabs of ice as shown may be accomplished by setting the pieces in position by hand as shown. The several slabs of ice being precooled and relatively dry will not freeze together at this container forming stage but will stand in place guided by hand if necessary while being filled and having placed thereon the cover lid preparatory to being introduced into the freezing tunnel. In the subsequent freezing operation the product within the container will bind the ice slabs together with a frozen bond at the inner engaging surfaces of the product and the ice walls.

When thus made up as shown at 6b, the ice container is introduced into the refrigerating tunnel 2. This may be accomplished by placing said container at the entrance of the tunnel and employing a ram or plunger such as 11 to force the container into the tunnel. The plunger may be operated by any suitable power cylinder, not shown. It will be understood that successive ice containers such as 6b will be likewise introduced into said tunnel one behind the other to form a continuous column of such containers in the tunnel in end to end abutment. With the plunger forcing each successive container into the tunnel it will move said column along through the tunnel to cause the container at the rear end of said column such as indicated at 6c to emerge therefrom. The refrigerating tunnel 2, for a portion of its length, is preferably designed with its four inclosing sides dimensioned to closely fit the ice containers being pushed therethrough as indicated in sectional view, Fig. 6. The walls of said tunnel are of good heat conducting material such as metal and are made hollow in the usual manner for a continuous circulation of a refrigerant therein such as cold brine 12, preferably at a temperature of about −20° F. It will be appreciated that during the passing of the ice containers through the close fitting tunnel 2, the walls of said containers are confined against displacement from the freezing of the contained food product. The expansive tendency of the freezing food product will cause the latter to fill up and conform itself in compressed shape to the inside of the container and in effect to be molded therein.

If desired, a rear portion of said tunnel 2 as indicated at 2a may be slightly enlarged in its cross sectional dimensions so as to leave a slight space around the column of ice containers as indicated in the cross sectional view, Fig. 5. This enlargement of the tunnel is for the purpose of making it easier to force the ice containers therethrough. In the enlarged portion of the tunnel 2a the floor of the same may be provided with cleats 13 as indicated in Fig. 5, over which the column of ice blocks will easily slide. The inlet and outlet pipes for circulating the cold brine within the hollow walls of the tunnel are indicated at 14 and 15. It will be understood that the length of the refrigerating tunnel 2, 2a and the rate of travel of the ice block column therethrough will be accommodated to accomplish a thorough and quick freezing of the food product between the inlet and discharge end of said tunnel. Various other constructions of refrigerating apparatus may be employed for this refrigerating step. For example the food product within the described ice containers may be frozen in a machine commercially known as a "Plate Froster" as illustrated in U. S. Patent No. 1,822,123 or in a "Belt Machine" as shown in U. S. Patent No. 1,773,079. However, it will be found that the design of tunnel shown will be very efficient for a quick freezing process, since the walls of ice are in direct contact with the food and the cold walls of the tunnel are in direct contact with the ice walls all of which contributes to a very rapid and efficient heat transfer from the food to the refrigerant.

Upon emerging from the outlet end of the tunnel the column of ice blocks may be easily separated into their individual block shaped containers since although passing through the tunnel in end to end contact, the blocks will not freeze together in the absence of moisture. Each ice container block after being separated from the ice column at the outlet end of the tunnel is then subjected to a further step of reducing the thickness of its ice walls from the original dimension of about 3 inches to about ⅛ of an inch. In Fig. 3 the dotted lines 6x show the reduced outer dimensions of the block after removal of surplus thickness of the walls. This reduction of wall thickness may be accomplished by operating the ice container as indicated at 6d against a moving saw blade 16. Guide rails 17 are provided on said table 18 for assistance in this operation and to insure that the precise thickness of surplus stock may be sheared off. The block 6d may be successively turned over to present each of its sides in turn to the action of said moving saw blade 16 until all six sides have been sheared off to the desired thinness, whereupon the ice container block will have the appearance shown at 6e. As indicated in the drawings the greater part of the exterior thickness of the original ice walls or slabs are cut away so as to reduce the container to a relatively thin ice shell which completely surrounds the frozen food product. The same amount of ice thickness is cut away from all sides so that the resulting thin ice shell is of uniform thickness throughout all as shown by dotted lines in Fig. 3.

The ice block 6e with its contained frozen food product is now ready for being enveloped in a wrapper material, for storage and shipment. A thin flexible wrapper is sufficient for this purpose although cartons or boxes may be used if desired. The wrapper should be both moisture proof and vapor proof and sealed around the container to give the final appearance as shown in Fig. 4. The container may be wrapped by hand but I have indicated at 19 a conveyor for carrying the containers into an automatic wrapping machine indicated generally at 20.

Preferably all of the operations performed on the makeup table 1 and delivery 3 including the wrapping of the containers by hand or in the wrapping machine should be performed in a surrounding atmosphere at sub-freezing temperature so as to prevent any thawing out of the walls of the container. The final wrapping operation in the automatic wrapping machine may take place at a temperature slightly above 32° F. if performed quickly so as to only momentarily expose the finished package to a thawing temperature. However, there should be no sustained exposure to thawing temperature. The dotted line 21 surrounding the parts shown in Fig. 1 is for diagrammatically indicating the walls of a room in a building within which the apparatus may be located and which room should be maintained at a temperature not about +28° F. It is also important as heretofore stated that the wrapped packages after delivery from the wrapping machine shall be continually maintained at sub-freezing temperature during storage, shipment, and up to final delivery to the consumer.

In the modified form of my package shown in Fig. 7 I employ only two slabs of relatively thick ice, viz. about 3 inches thick, to form the ice holder or container for the packed food product. In the formation of such a holder the bottom ice slab 22 is first placed in the metal form frame 23 similar to that indicated at 4, and the food product 5a is packed down tightly upon said bottom ice slab. Then a top slab of ice 24 also about 3 inches thick is placed in the form frame on top of the packed food product 5a as shown in Fig. 7. In using such a package it is preferred to pass the entire assembly of form frame 23 and its above described contents through the freezing tunnel 2 and 2a. The top and bottom walls of the tunnel will directly contact the top and bottom slabs of ice 22 and 24 during passage through portion 2 of the tunnel. The sides of the tunnel will contact the metal sides of the form frame during this part of the travel through the tunnel.

The quick freezing process will be very efficiently accomplished in this form of package although perhaps not quite as good as with the container made of ice on all six sides. Upon emerging from the freezing tunnel the package of Fig. 7 may be dipped in water to loosen the metal frame from the packed ice holder of two slabs. Thereafter the said holder is presented to the cutting action of the saw 16 to cut down the thickness of the upper and lower slabs of ice preferably to about 1/8 inch in thickness.

Some of the advantages from the use of my process may be enumerated as follows:

The food product may be packed in predetermined sizes of package and with a predetermined weight. Since the ice shell is of uniform thickness the gross weight of the package is thus accurately controlled.

The package will be smooth and regular on its outer surfaces of such predetermined size and shape that it will be conveniently handled in a wrapping machine.

The container for the package consists of ice which is a low priced commodity as compared with paper, wood, and other materials. Inasmuch as the completed package is to be maintained at sub-freezing temperature until it reaches the consumer it becomes practical to use ice as the principal building material for the container and thus save cost over the use of more expensive materials.

During the freezing process there is a minimum loss of power required for cooling other materials than the food product. There is no excess of moisture or water to be frozen while the food is being frozen.

The food product is delivered to the consumer frozen in its initial container (modified as described) and the necessity of unloading the food product from freezing molds is avoided.

The quantity of food contained and the size, shape, and gross weight of the finished package may all be predetermined with great precision, which is a factor of great importance in consumer packages.

The consumer's job in recovery of the food product from its ice wall container is facilitated by several factors. The ice shell is made relatively thin so as to be frangible and easily broken away from the contained food block. The character of the frozen surface bond between the ice walls and the contained frozen food block insures predetermined planes of relatively easy cleavage at the surface of the block. The housewife in recovering the food product from the container merely strikes the package a sharp blow against some hard object to shatter the ice shell which readily separates from the frozen food block along said predetermined planes at the surface of the block. The food block thus separated from its ice shell is then more quickly thawed out for use.

I claim:

The method of producing a quick frozen food product in package form which comprises, preforming a container consisting of thin ice walls having smooth inner surfaces, cooling said walls to a temperature substantially below the freezing point of water, packing said container only with a solid food product to bring the solid food in direct and intimate contact with said prefrozen inner surfaces of the container, and then subjecting the so packed container to a quick freezing temperature appropriate to the food to be frozen to quick freeze the contents and to characteristically unite the surfaces of the contents which are in contact with said prefrozen smooth walls to said walls by the initial transfer of heat to the frozen walls from the food and the subsequently applied quick freezing temperature to form a unitary package the thin ice walls of which are refrigerated by said frozen contents.

THOMAS SLADE GORTON, JR.

REFERENCES CITED

The following references are of record in the file of this patent:

UNITED STATES PATENTS

| Number | Name | Date |
| --- | --- | --- |
| 226,390 | Davis | 1880 |
| 1,487,883 | Peterson | 1924 |
| 2,340,337 | McNaught | 1939 |

FOREIGN PATENTS

| Number | Country | Date |
| --- | --- | --- |
| 442,591 | France | 1911 |
| 348,443 | Great Britain | 1931 |
| 53,132 | Norway | 1933 |